3,436,236
REFRACTORY COMPOSITION
Erwin J. Gamber, North Royalton, and Roger R. Rauschenbach, Cleveland, Ohio, assignors to Aluminum Company of America, Pittsburgh, Pa., a corporation of Pennsylvania
No Drawing. Filed Dec. 1, 1966, Ser. No. 598,188
Int. Cl. C04b 11/00
U.S. Cl. 106—56    5 Claims

ABSTRACT OF THE DISCLOSURE

A non-fired refractory is made by combining colloidal silica sol with gypsum plaster and fused silica, or other refractory filler. The set and dried refractory may be employed where improved resistance to attack by molten aluminum or alloys thereof is desired.

---

This invention relates to a refractory composition which resists attack by molten aluminum or alloys thereof. The invention is especially concerned with a non-fired type of refractory consisting essentially of gypsum plaster, a refractory filler having a particle size not greater than that corresponding to 20 on the Tyler scale and dried colloidal silica, in the proportions derived from setting and drying a mixture consisting essentially of, by weight, (1) 1 part colloidal silica sol and (2) 1.5 to 3 parts suspended solids composed of 5 to 55 parts gypsum plaster, calculated as the hemi-hydrate, and 45 to 95 parts of the refractory filler.

Various kinds of refractories are used in the construction of furnaces, ladles and other equipment employed in contact with molten metal. The nature of the molten metal effects the choice of the refractory, and the more reactive the metal the more restricted becomes the choice of suitable compositions. This restriction in choice has been especially evident in the field of fired refractories that can be used in contact with molten aluminum. For example, the well-known fired silica refractories react with molten aluminum and its alloys and must be avoided.

A similar limitation exists among the non-fired refractory compositions, as well as the problem of securing a bonding material which will not disintegrate upon repeated or continued exposure to hot gases and metal. In referring to fired and non-fired refractories it is to be understood that this identifies the treatment of the refractory bodies before they are placed in service. The firing operation usually produces a fusion or plastic bonding together of one or more components of the formulation, and the bond is frequently referred to as being a ceramic bond. In the case of the non-fired refractories, one or more of the components develops a rigid structure, usually through the absorption or combination with water. Such refractories must, of course, be dried before being used to eliminate any free water.

The non-fired type of refractory is desired for many purposes because it can be easily molded to the required shape and does not require the preliminary exposure to high temperatures of the fired type. Because of its lower cost and other characteristics it is economically possible in some cases to discard the molded shape after a single use. Among the well-known non-fired types of refractory products are those made of hydrated gypsum plaster or of silica bonded with colloidal silica. These materials have often been used for the production of molds which must have great dimensional accuracy and provide a very smooth surface. Both of these materials have shortcomings, however, and this invention is addressed to overcoming these disadvantages.

One of the objects of this invention is to provide a non-fired refractory composition which is substantially inert toward molten aluminum and its alloys. Another object is to provide a non-fired refractory composition which is adapted to the production of molds that faithfully reproduce a pattern without requiring allowance for shrinkage or expansion upon setting. Still another object is to provide a non-fired refractory composition which sets relatively rapidly and thus reduces the time required for holding such refractory in contact with pattern equipment.

These and other objects and advantages will become apparent from the following description of the invention and embodiments thereof.

This invention proceeds from the discovery that a highly useful non-fired refractory can be made by combining hydrated gypsum plaster, finely divided fused silica or other refractory filler and colloidal silica sol. When the foregoing components, combined in the proper proportions in a castable slurry, have been poured into a mold or around a pattern, set, removed from the pattern and the mixture subsequently dried, the dried product will have almost precisely the dimensions initially established. The pattern dimensions are generally duplicated within $\pm 0.001$ inch per inch of dimension which considerably relieves the need to make allowances for expansion or contraction. Moreover, the product has an exceptional resistance to attack by molten aluminum and its alloys and can be used in contact with the metal over an extended period of time. Contrary to prior experience, the silica component of the refractory composition is not selectively attacked by molten aluminum, the gypsum plaster apparently serving to protect the silica against attack. There is an added advantage of a freshly set product strength that will permit handling, whereas the well-known colloidal bonded silica products are too weak for handling. After only fifteen minutes setting time, the improved refractory typically exhibits a green tensile strength of over 40 p.s.i., and after drying at 1400° F. a baked compressive strength of over 1000 p.s.i. The known colloidal bonded silica products are typified by green tensile strength levels under 10 p.s.i. and baked compressive strength levels under 500 p.s.i. If the refractory composition is to be used to form a mold, which should possess some degree of permeability, such can be accomplished by adding a suitable foaming agent to the mixture and then beating air into the slurry before pouring it over or into a pattern.

Referring now to the individual components and their proportions, gypsum plaster is composed of finely divided calcium sulfate hemi-hydrate, the preferred variety being that generally called the alpha form. Also the gypsum plaster is preferably of premium commercial quality. As is known, the hemi-hydrate absorbs water to form the di-hydrate that is relatively hard. The proportions stated hereinafter refer to the hemi-hydrate form.

The silica component should be finely divided, the particle size selected being influenced by the nature of the surface desired. A very fine powder, for example, less than 200 mesh, will provide a very smooth surface. It has been found that the particle size may vary between about 20 and minus 325 mesh, as measured on a Tyler standard scale.

Although fused silica is preferred, other refractory filler materials can be employed, such as alumina, zircon sand, perlite, silica sand or olivine sand. These materials may also be used in finely divided form and within the mesh size range stated above. For particular purposes it may be desirable to employ a mixture of one or more of these or other refractory type materials. Inasmuch as these substances and fused silica constitute a group of refractory materials which serve a common purpose in the composition they are referred to as the refractory filler component.

With respect to proportions of the dry ingredients, the hemi-hydrate gypsum plaster and refractory filler should be employed in the amount of 5 to 55 parts of the former to 45 to 95 parts of the latter, by weight. The amount of plaster used may be determined by the nature of the metal to come in contact with the refractory composition. For example, for exposure to aluminum or to aluminum alloys having a relatively low magnesium content, i.e., less than 1%, the plaster content of the composition may be chosen to be 10 parts, or less, to 90 parts, or more, filler, but for alloys containing larger amounts of magnesium, say 2 or 3 percent, or magnesium and zinc, the quantity of plaster is preferably increased to 20, or more, parts to 80 parts, or less, filler. More than 55 parts plaster to 45 parts filler does not afford any improvement in resistance to attack by molten metal and may introduce dimensional variations due to expansion and may result in excessive sensitivity to thermal shock. In fact, to obtain the best results, the amount of the refractory filler should exceed that of the plaster, and preferably in a proportion on the order of two parts of the filler material to one part of the plaster.

The colloidal silica sol component may be selected from the many commercially available varieties providing the pH does not exceed 8.5, although rather dilute preparations may introduce undesired water. Colloidal sols which contain from about 25 to 50% $SiO_2$ are preferred. It has been found that a higher pH is not compatible with the plaster. The preferred sols are those which have a pH of less than 7 and are commonly referred to as being of the acidic type.

The colloidal silica sol should be used in the proportion, by weight, of one part of the sol to between 1.5 and 3 parts total weight of plaster and refractory filler, assuming that the $SiO_2$ content of the sol is between 25 and 50%. If more dilute or concentrated sols are employed, then allowance must be made for the increased or lessened water content in preparing a slurry of the refractory. Using the components in the proportions described above, the dried and cured refractory will generally consist essentially of, by weight, about 3.5 to 50% gypsum plaster calculated as the hemi-hydrate, about 33 to 90% inert refractory filler and about 7.5 to 25% silica supplied as colloidal silica sol. These calculated, round number, proportions are based on considering the gypsum plaster as the hemi-hydrate although it should be understood that the water content may vary depending on drying and curing conditions. This causes corresponding variations in these percentages.

If the colloidal silica sol does not provide sufficient water to form a pourable slurry, additional water may be introduced to produce the desired consistency, especially if the slurry is to be vigorously stirred to develop a foam-like consistency.

When the slurry has been properly mixed and poured over or into a pattern or mold, the composition is allowed to set which normally occurs within a matter of minutes. After setting, it is removed from the pattern and dried. This may be done by heating the part to a temperature between 200° and 1400° F. Temperatures toward the lower end of this range, 200° to 800°, do not remove water of hydration from the plaster. This produces a refractory most suited for use as a hot mold. Higher temperatures, e.g., 800° to 1400° F., remove water of hydration and result in a refractory suitable for a high chilling rate, and also reusable.

The principal components identified above may be supplemented by minor additions of well known gelling or setting agents. For example, a very small amount of MgO, about 0.01 to 1.0 part per 100 parts of dry ingredients, can be advantageously added to the dry mixture to accelerate the gelling of the colloidal silica. Similarly less than 1 part, per 100 parts dry aggregate, of terra alba, sodium sulfate, sodium chloride or citric acid can be introduced to accelerate or decelerate the setting of the plaster. In addition small amounts of known foaming agents can be introduced such as described in U.S. Patent 2,754,220. Where foaming agents are added, the slurry should be beaten enough to produce an increase in volume of about 25% to 100% which yields a product having a permeability of 1 to 30 on the American Foundrymen Society (AFS) scale. The non-foamed compositions have an AFS permeability of less than one.

If desired, the resistance to molten metal attack of the refractory may be enhanced by additions of graphite, or other forms of carbon, in amounts of 0.75 to 10 parts carbon per 100 parts of dry aggregate. One to two parts graphite provides very good results. If more than 5 parts are employed, the strength of the refractory may be diminished and it is advisable not to exceed this level in those applications where strength is of importance. The graphite or carbon may be added at any stage of constituent blending although it is more convenient to add such in finely divided form, e.g., 325 mesh or finer, to the dry aggregate prior to adding the colloidal silica sol.

The invention is illustrated in the following examples of both foamed and non-foamed compositions and their resistance to thermal shock and attack by molten aluminum alloy.

Example 1

An electronics component housing measuring 2¼ x 2¾ x 1 inches and having walls ⅛ inch thick is to be cast from an aluminum alloy containing nominally 5% Si, 1.3% Cu and 0.5% Mg using the improved mold composition in the foamed condition. The mold drag, or bottom portion, is prepared from the following mix:

| | | |
|---|---|---|
| Alpha gypsum plaster | pound | 0.22 |
| Fused silica | do | 0.78 |
| Colloidal silica sol | do | 0.45 |
| Magnesium oxide | gram | 1 |
| Sulfonated hydrocarbon foaming agent | ml | 0.3 |

In preparing the mix, 90% of the fused silica is blended with all the plaster. This aggregate is then blended slowly with constant mixing into the colloidal silica sol to which the foaming agent was previously added. The mixing is continued after the solids are added for a total mixing time of about 1 minute. The remaining 10% of the fused silica is blended with the magnesium oxide and this blend added to the colloidal silica sol and mixed for ½ minute. The mixing up to this point is vigorous enough to foam the slurry. The resulting foamed slurry is poured into the mold pattern where it gels in 2 to 3 minutes to become a firm but rubbery-like mass. After 10 to 12 minutes, the slurry sets to become hard and strong. At this point, the mold drag is removed from the pattern and cured by first drying in air for 24 hours. It is then heated to 1400° F. in increments of 2 to 4 hours at 400° F., 2 to 4 hours at 800 F., and then heated to 1400° F. and held at that temperature for 16 hours. Finally the mold drag is slowly cooled in the furnace to complete the curing sequence. The mold drags so produced had a permeability of 5 on the AFS scale.

Typifying the performance of these mold drags, one was used in making eleven castings and was still in very good condition showing practically no evidence of deterioration. Prior art plaster mold drags are only suitable for a single casting because of extensive deterioration.

Example 2

A series of tests were made to determine spalling and general corrosion resistance for several mold compositions. The tests were run using an aluminum alloy containing nominally 1.6% Cu, 2.5% Mg, 0.3% Cr and 5.6% Zn. This alloy is especially reactive and a 240 hour exposure to such at a temperature of 1300° F. is considered a rather severe test. Several unfoamed compositions were tested to determine the effect of varying gypsum and fused silica proportions. In each case, colloidal silica sol was provided in an amount equal to 45 to 50% of the weight of the dry aggregate (fused silica and gypsum). One gram of magnesium oxide was added per pound of dry aggregate. The following table summarizes the results of the tests:

| Test No. | Gypsum content (parts) | Fused silica content (parts) | Test results |
|---|---|---|---|
| 1 | 0 | 100 | Severe spalling. |
| 2 | 10 | 90 | Slight spalling. |
| 3 | 20 | 80 | No spalling. |
| 4 | 30 | 70 | Free of any attack. |
| 5 | 40 | 60 | Do. |
| 6 | 50 | 50 | Do. |

These tests clearly demonstrate that in this severe test the absence of any gypsum renders the composition unsuitable. When the dry aggregate contains 10 parts gypsum, conditions are much improved although still rather marginal in this harsh environment. Far better results are achieved in the 20 to 50 parts plaster range, although the rate of improvement diminishes as the gypsum content exceeds 30 or 40 parts of the dry aggregate.

Additional tests were made to determine the effectiveness of small carbon additions to a sample of the same composition described in the table above for Test No. 2. Here 1 part graphite per 100 parts dry aggregate was added to the composition. The test samples exhibited no spalling which illustrates the benefit of adding small amounts of carbon in further improving the resistance of the composition to molten metal attack. Under different test conditions 5 parts graphite was found to improve the performance of the Test No. 6 composition whereas such produced no change in performance for the Test No. 1 composition. This indicates that the presence of graphite improves the resistance to molten metal attack of the described refractory throughout the composition range set forth herein, but that the improvement is not realized with the prior art (Test No. 1) composition.

What is claimed is:

1. A non-fired refractory consisting essentially of gypsum plaster, a refractory filler having a particle size not greater than that corresponding to 20 on the Tyler scale and dried colloidal silica, in the proportions derived from setting and drying a mixture consisting essentially of (1) part colloidal silica sol, and
(2) 1.5 to 3 parts suspended solids composed of 5 to 55 parts gypsum plaster, calculated as the hemihydrate, and 45 to 95 parts of the refractory filler, the proportions being by weight, said refractory being characterized by substantial inertness to attack by molten aluminum and aluminum base alloys.

2. A refractory according to claim 1 wherein the refractory filler consists of fused silica.

3. A refractory according to claim 1 where the suspended solids mixture contains additionally, per 100 parts thereof, 0.01 to 1.0 part MgO.

4. A refractory according to claim 1 where the suspended solids mixture contains additionally, per 100 parts thereof, 0.75 to 10 parts carbon.

5. A non-fired refractory consisting essentially of gypsum plaster, fused silica having a particle size not greater than that corresponding to 20 on the Tyler scale and dried colloidal silica, in the proportions derived from setting and drying a mixture consisting essentially of (1) one part colloidal silica sol, containing 25 to 50% $SiO_2$, and
(2) 1.5 to 3 parts suspended solids composed of 5 to 55 parts gypsum plaster, calculated as the hemihydrate, 45 to 95 parts fused silica and, per 100 parts of said suspended solids, 0.01 to 1 part MgO and 0.75 to 10 parts carbon, the proportions and percentages being by weight, said refractory being characterized by substantial inertness to attack by molten aluminum and aluminum base alloys.

References Cited

UNITED STATES PATENTS

| 2,314,626 | 3/1943 | Neiman | 106—69 |
| 2,380,945 | 8/1945 | Collins | 106—69 |

JAMES E. POER, *Primary Examiner.*

U.S. Cl. X.R.

106—38.3, 38.9, 58, 63, 69